(12) United States Patent
Goetzman

(10) Patent No.: US 6,629,513 B1
(45) Date of Patent: Oct. 7, 2003

(54) INFINITE LOOP ENGINE

(76) Inventor: Robert G. Goetzman, 12914 Cinnimon Pl., Tampa, FL (US) 33624

( * ) Notice: Subject to any disclaimer, the term of this patent is extended or adjusted under 35 U.S.C. 154(b) by 0 days.

(21) Appl. No.: 09/049,195

(22) Filed: Mar. 27, 1998

Related U.S. Application Data

(60) Provisional application No. 60/041,629, filed on Mar. 27, 1997.

(51) Int. Cl.[7] .................................................. F02B 57/00
(52) U.S. Cl. ................................ 123/43 R; 123/190.12; 91/196
(58) Field of Search ................................ 123/43 R, 43 C, 123/44 R, 44 E, 190.12; 91/196

(56) References Cited

U.S. PATENT DOCUMENTS

| | | | | |
|---|---|---|---|---|
| 1,180,628 A | * | 4/1916 | Allen | 123/162 |
| 3,319,615 A | * | 5/1967 | Girerd | 123/43 R |
| 4,274,327 A | * | 6/1981 | Olsgaard | 91/196 |
| 5,351,657 A | * | 10/1994 | Buck | 123/43 C |

* cited by examiner

*Primary Examiner*—Michael Koczo
(74) *Attorney, Agent, or Firm*—William H. Holt

(57) ABSTRACT

An internal combustion engine including an engine block, a power cylinder mounted for revolving within the block and having a reciprocating, non-rotating piston which includes drive pins cooperating with and driving the power cylinder. A cam cylinder cooperates with the power cylinder and each includes ports in the sides thereof which periodically align with each other for forming intake and exhausts ports.

8 Claims, 3 Drawing Sheets

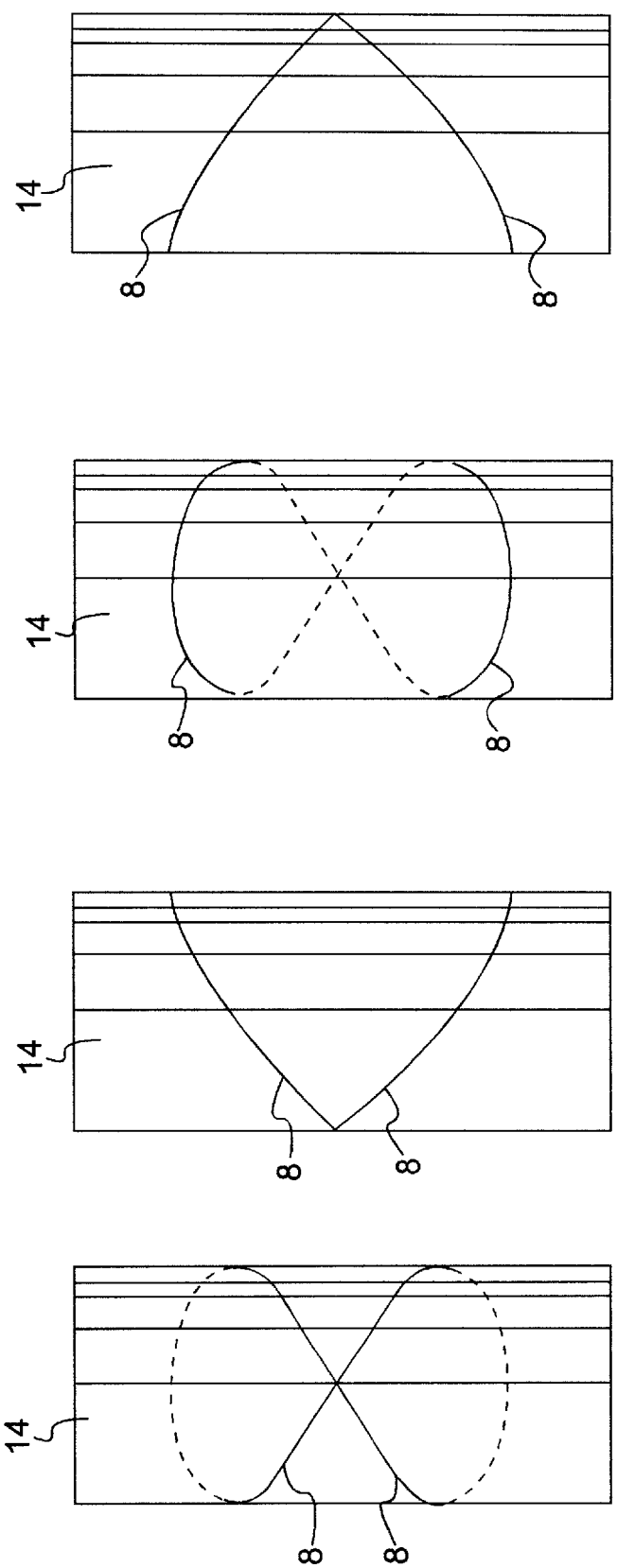

INFINITE LOOP ENGINE

This application claims the benefit of provisional application 60/041,629 filed Mar. 27, 1997.

BACKGROUND OF THE INVENTION

1. Field of the Invention

This invention refers to an internal combustion engine that differs from the classic piston engine in several basic ways.

2. Description of the Related Art

A search was carried out in the U.S. Patent Office for any patents that might be relevant or anticipatory of the present invention. The search was conducted in class 123, subclasses 43A, 43AA, 43C, 44R, 58A, 58AM and 58C. No patents were found which contain teachings considered to be anticipatory of the present invention. However, the following patents were selected as having some relevancy as to function and/or design:

| U.S. Pat. No. | Inventor | Title |
| --- | --- | --- |
| 2,770,140 | V. E. Palumbo | Cam Mechanism |
| 2,949,100 | A. L. Petersen | Rotary Engine |
| 3,068,709 | A. L. Petersen | Roller and Wrist Pin Construction for Rotary Engines |
| 4,366,784 | B. B. Paul | Crankless Cam Driven Piston Engine |

SUMMARY OF THE INVENTION

The infinite loop engine of the present invention utilizes a reciprocating piston; however, although it may utilize a crank shaft and/or a flywheel in its design, it may not require these in some embodiments, for several potential uses of same as hereinafter described.

Power is transferred by the piston to a cylinder by means of drive pins tracking an infinite loop groove cut into the wall of the cylinder, causing the cylinder to revolve. The piston reciprocates back and forth within the cylinder but does not rotate. The piston is restrained from rotating by means hereinafter described.

In the two cycle embodiment of the invention, a power cylinder is present but no valve cylinder. In the four-cycle version or embodiment of the invention, the engine includes both a valve cylinder and a power cylinder. Valve action for the engine is done through the use of oval slot ports cut into the sides of the cylinders that match at the appropriate time with passageways in the engine block that form the intake and exhaust ports. The valve cylinder is located on either side of the revolving power cylinder. The valve cylinder is gear driven to turn at half the speed of the power cylinder and in the opposite direction. The intake port is closed on the power stroke and the exhaust port is closed on the compression stroke.

BRIEF DESCRIPTION OF THE DRAWINGS

FIGS. 4, 4*a*, 4*b*, and 4*c* are side elevational views of a cam cylinder employed in the infinite loop engine of the present invention, each figure "rotated" 90 degrees from the previous Figure in order to illustrate the infinite slot in the wall of the cam cylinder.

DETAILED DESCRIPTION OF THE INVENTION

Figure 1:
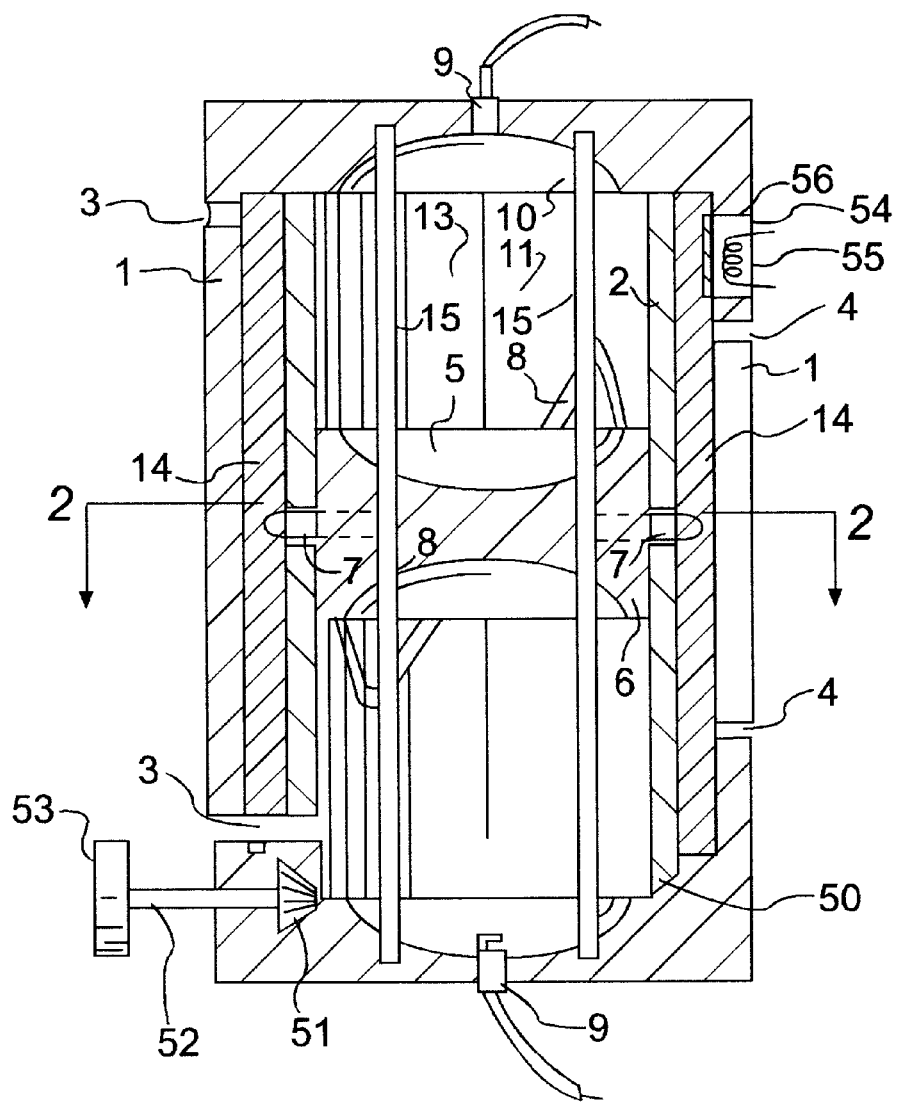
FIG. 1 is a longitudinal sectional view through a two-cycle engine of the invention, employing a single piston; and illustrating also a means for power take off from the rotating power cylinder, as well as an optional magneto.

Referring now to the drawings in detail, the engine block in the figures is designated by the numeral 1. Useful power from the engine is accomplished by appropriate mechanical linkage as shown in FIG. 1, or other type of transference from a rotating power cylinder 2, such as electrical from a magneto-coil arrangement as also shown in FIG. 1. Power cylinder 2 is caused to rotate by a reciprocating, non-rotating piston 6 contained within the power cylinder. In FIG. 1, power takeoff for the engine from power cylinder 2 is accomplished by having the end 50 of the rotating power cylinder bevelled as shown and mechanically coupled or linked to bevel gear 51, the drive shaft 52 of which gear is coupled or connected to a flywheel or clutch 53, for power utilization in any appropriate setting or usage as desired. In addition to this embodiment or way of achieving power utilization, or in place thereof, an engine as illustrated in FIG. 1 may achieve power output by utilizing a magneto arrangement 54 comprising a magnet 56 in the wall of the rotating power cylinder inducing a voltage in coil 55. This may serve to provide electricity to the spark plugs to spark the engine and/or for the engine to operate as an electrical generator with no mechanical takeoff at all.

Typical uses as a generator would be to provide electricity for power tools or a sump pump or for emergency lighting, etc.

To increase the working area or volume of the engines, the pistons 6 may suitably have concave ends 5 and the cylinders may also have concave ends or heads 10, as shown in FIG. 1. Pins 7, or the equivalents thereof, are employed in the engines, projecting from the sides of the pistons into infinite loop slot openings 8 in power cylinders 2 and into such slot openings in cam cylinders 14, or vice versa, as shown in FIGS. 1 and 2.

As shown in FIG. 1, piston 6 reciprocates but is prevented from rotating within cylinder area 13 by means of anti-rotation rods 15. A suitably designed and affixed single rod may also accomplish this function. Because of the pins 7 in the infinite loop slot openings 8 in the power cylinder 2 and in the cam cylinder 14, as the piston reciprocates, the pins 7 cause the cam cylinder 14 to rotate, as well as the power cylinder. One spark plug 9 is located in the combustion chamber area 11 of the cylinder 13 above piston 6 and a second spark plug 9 is located in the combustion chamber area 12 of cylinder 13 below piston 6. Combustion areas 11 and 12 each possess an intake valve port 3 and an exhaust valve port 4. As illustrated in FIG. 1, piston 6 is at mid-stroke, moving upwardly. Area 12 is in intake stroke taking in fuel gas mixture from conventional means not shown (intake valve port 3 open) and area 11 is in compression stroke (neither intake valve port 3 nor exhaust valve port 4 open).

Figure 3:
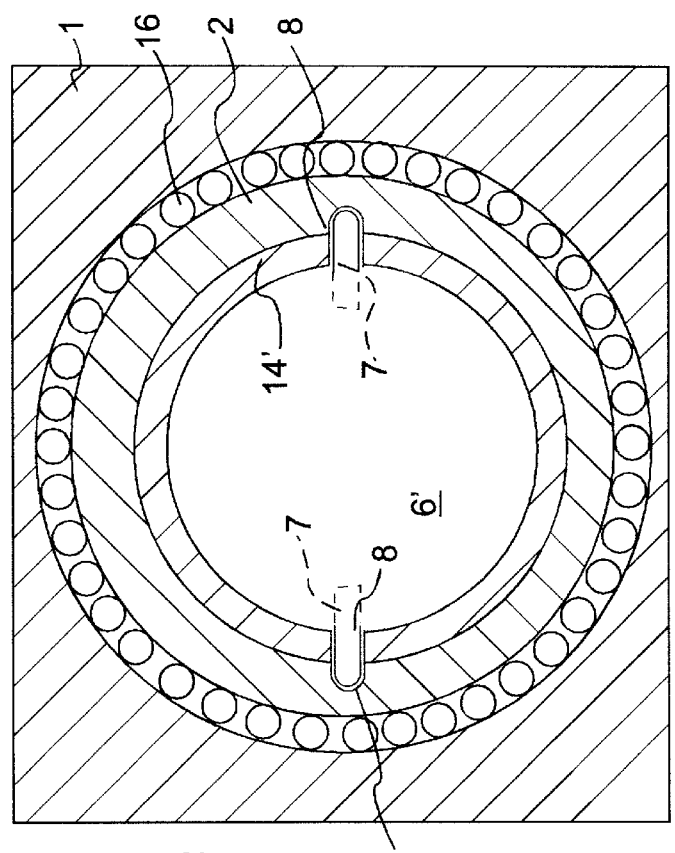
FIG. 3 is an enlarged cross-sectional view of the two-cycle engine of FIG. 2, differing also from same in its employment of bearings.
Figure 2:
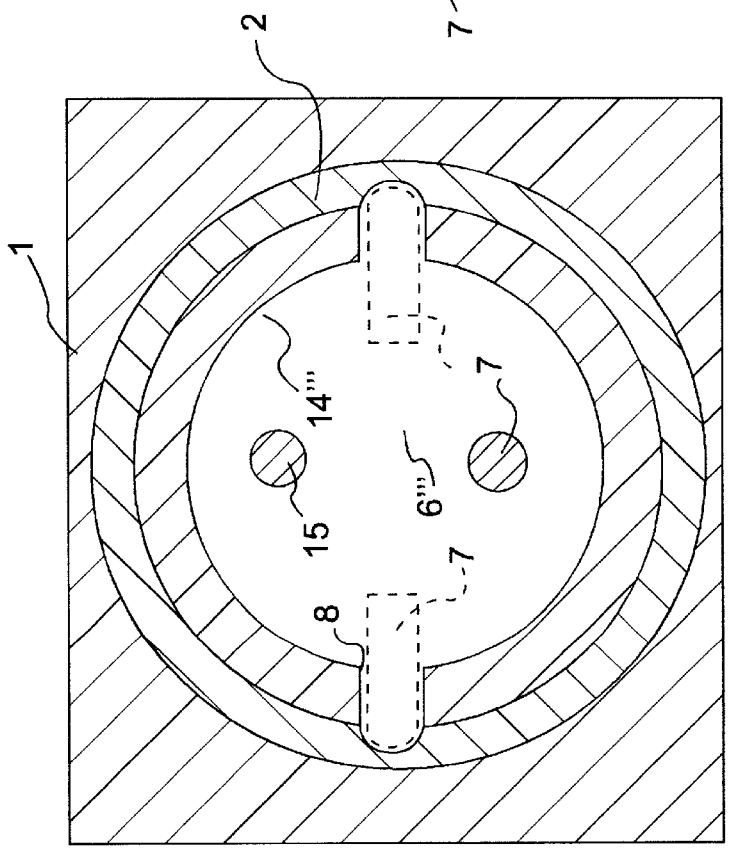
FIG. 2 is a cross-sectional view on line 2—2 of FIG. 1.

Reference is now made to FIGS. 2 and 3, each of which illustrates means for providing reciprocating, but not rotation of the pistons used and/or that might be used in the design and/or the carrying out of the present invention.

In the engines of FIGS. 2 and 3, the piston 6 employed is oval in cross-section and obviously, therefore, is unable to rotate in cam cylinder 14'. However, because of pins 7, which extend from inside the wall of piston 6 into the infinite loop slot or groove openings 8 in the wall of power cylinder 2, the reciprocating motion of piston 6 when the engine is fired causes power cylinder 2 to rotate as the piston goes up and down (or back and forth) within the cam cylinder 14. The identical action of FIG. 2 takes place in the case of the engines of FIG. 3, with the exception that the rotation of the power cylinder 2 within the engine block 1 is made more efficient or substantially frictionless by the utilization of bearings 16 between the outer wall of the power cylinder 2 and the inner wall of the engine block 1. Such bearings 16 may also be employed in other engine embodiments of the invention such as between the cam cylinder 14 and the engine block 1 of the engines of FIGS. 1 and 2.

In the engine design of FIG. 2, the use of guide (anti-rotation) rods 15 extending longitudinally through the cylinder (as well as through the piston) and suitably affixed to the engine block at each end of the cylinder prevents the rotation of the piston within the cam cylinder even though the outer wall of the piston and the inner wall of the cam cylinder are both cylindrical in shape.

The engines of the present invention can be fabricated from any suitable materials including metals, ceramics and high-temperature resistant, high strength rigid plastics. The engine is particularly characterized by its compactness and simplicity of design and can be easily manufactured and fabricated utilizing current tooling of no special design.

The engine fulfills the useful concept of converting heat to rotational motion capable of performing work; and makes possible the construction of a simpler engine of more compact size and much reduced weight over current engine designs in common use.

As indicated previously, the invention makes possible the design and manufacture of a new type internal combustion engine that is smaller and lighter than current designs, but can still be made with today's tooling. Multiple pistons can be mounted in the same cylinder, each riding in its own loop or orbit and the pistons can be double acting.

Obviously the above features of the engine also make possible more economically manufactured engines and also engines which require much less fuel consumption than conventional engines which require connecting rods, and a crank shaft and/or a flywheel in their basic design.

While the present invention has been described and illustrated in detail, various modifications may be made by those skilled in the art. It is therefore to be understood that the invention is not to be limited to the details of construction described and illustrated and it is intended by the appended claims to cover all modifications which fall within the spirit and scope of the invention.

I claim:

1. An engine comprising an engine block, a power cylinder mounted for revolving within said block; a non-rotating piston mounted within said power cylinder for reciprocating therein; means for precluding rotation of said piston, a cam cylinder located between said power cylinder and said block, said power cylinder and said cam cylinder each having an infinite loop groove formed in its interior wall; drive pin means extending between said piston and said power cylinder for moving in and tracking the path of the infinite loop groove in said power cylinder so that said power cylinder is caused to revolve in said block when said piston reciprocates within said power cylinder; and valve means for said engine including slot ports formed in the walls of said power and cam cylinders that align in timed sequence with passageways in said block for forming intake and exhaust ports, said engine further including bearing means mounted between said cam cylinder and said engine block.

2. An engine according to claim 1 wherein said cam cylinder surrounds said power cylinder and has two infinite loop grooves formed in an interior wall so that it moves at half the speed of the power cylinder.

3. An engine according to claim 1 having a plurality of pistons installed in said power cylinder, each of said pistons having a corresponding infinite loop groove in said power cylinder and each piston being horizontally opposed and fired from both ends.

4. An engine according to claim 1 wherein said drive pin means have rollers at the ends thereof in said cam cylinder and said rollers ride in and track the path of said infinite loop groove in said cam cylinder.

5. An engine according to claim 1 wherein the drive pins have rollers at the ends thereof in the power cylinder which rollers ride in and track the path of the infinite loop groove in the power cylinder.

6. An engine according to claim 1 wherein said means for preventing said piston from rotating being comprised of rod means extending through said piston and secured to said engine block, said piston being slidable upon said rod means.

7. An engine according to claim 1 including a plurality of non-rotating pistons reciprocating within said power cylinder.

8. An engine according to claim 7 including first spark means carried by said piston and second spark means being secured to said engine block.

* * * * *